Oct. 27, 1925.  1,558,773
S. G. BAITS
CLUTCH FOR AUTOMOBILES
Filed Aug. 2, 1923
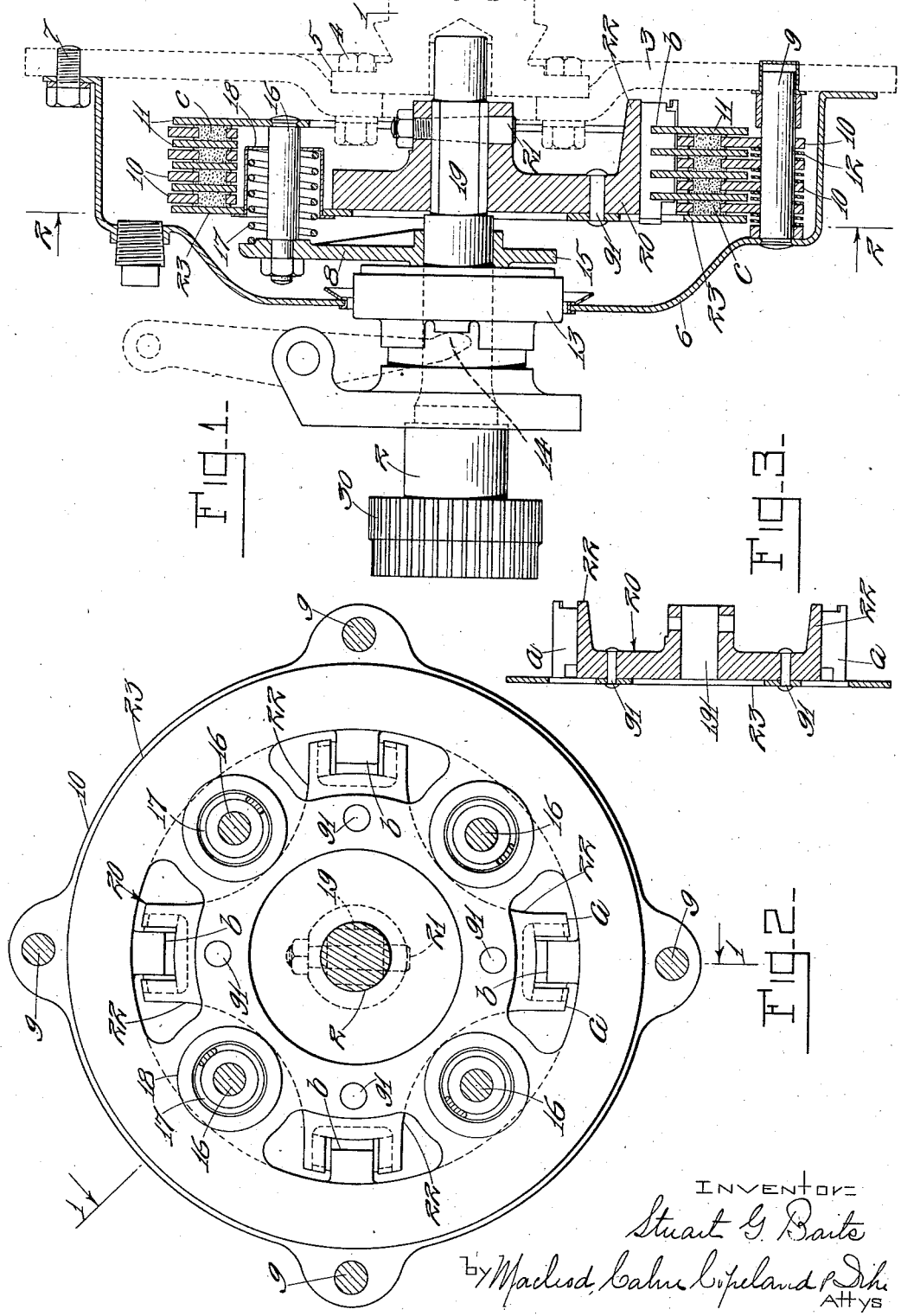

Patented Oct. 27, 1925.

1,558,773

UNITED STATES PATENT OFFICE.

STUART G. BAITS, OF DETROIT, MICHIGAN, ASSIGNOR TO HUDSON MOTOR CAR COMPANY, OF DETROIT, MICHIGAN, A CORPORATION OF MICHIGAN.

CLUTCH FOR AUTOMOBILES.

Application filed August 2, 1923. Serial No. 655,259.

*To all whom it may concern:*

Be it known that I, STUART G. BAITS, a citizen of the United States, residing at Detroit, county of Wayne, and State of Michigan, have invented a certain new and useful Improvement in Clutches for Automobiles, of which the following is a specification, references being had therein to the accompanying drawings.

The present invention has for its object an improved clutch for use in automobiles or other motor vehicles. The particular object of the invention is to provide a clutch which will be simple and inexpensive to construct and which will be more satisfactory to the user owing to the reduction in the mass and consequently the momentum of the moving parts.

The invention will be fully understood from the following description when taken in connection with the accompanying drawings, and the novel features thereof will be pointed out and clearly defined in the claims at the close of this specification.

In the drawings:

Fig. 1 is a vertical section taken substantially on the line 1—1 of Fig. 2, of a clutch embodying the present invention.

Fig. 2 is a section on line 2—2, Fig. 1, the clutch casing being omitted.

Fig. 3 is a detail of the spider.

Referring now to the drawings: at 1 is shown a crank shaft of an engine and at 2 the front end of the driven shaft of the transmission, said shaft having a gear 30 thereon. At 3, in dotted lines, is shown the flywheel secured by bolts 4 to a flange 5 on the crank shaft. The flywheel 3 forms the forward part of the clutch casing. At 6 is shown a housing secured by cap screws 7 to the flywheel. Between the flywheel 3 and the housing 6 is the usual series of driving pins, one of which is shown at 9 in Fig. 1, which pass through the driving rings 10. These rings may be provided with cork inserts as shown at C in Fig. 1, if desired. The driven rings are shown at 11 and alternate with the driving rings 10. Surrounding the driving pins 9 and separating each of the driving rings 10 are small spiral springs 12. These springs tend to separate the driving plates whenever the pressure which holds them together is released.

Loose on the driven shaft 2 is a throw-out bearing 13 operated by fingers 14, shown by dotted lines in Fig. 1, and connected to the clutch pedal, not shown. The throw-out bearing 13 when pushed forward to release the clutch acts on a star shaped member 15 having arms 8 which carry pins 16 each surrounded by a spring 17 which is guided in a thimble 18. These pins 16 are each riveted to the forward driven ring 11.

On the front end of the shaft 2 is a squared portion 19 which fits into a corresponding hole 191 in a spider 20. The spider 20 is of aluminum and is held against longitudinal movement on the shaft by a taper pin 21. The spider 20 is of the shape shown in Figure 2 and can preferably be made of an aluminum casting and therefore can be of very light weight. Since the hole 191 in the spider 20 which fits onto the squared end 19 of the shaft 2 is itself square, the load caused by the rotative effect is not taken by the taper pin 21, but is taken by the squared end. The spider 20 has arms 22 forked as shown at *a* to receive the corresponding lugs *b* on the inner periphery of the driven rings 11. At 23 is shown a steel plate riveted as indicated at 91 to the rear of the spider 20. This plate performs the functions of one of the driven rings 11 and carries the thimbles 18 which contains the clutch springs 17. Heretofore, it has been customary to make a single casting containing in one piece the forks 22 of spider 20 and the rear plate or backing 23. This has necessitated heavy construction with additional weight at a distance from the axis of rotation and therefore has increased the momentum of the clutch after being released; consequently, has increased the difficulty of shifting gears. It has also been necessary to make this part of iron or steel on account of the loads which it is required to carry and this has further increased the objections due to momentum. By making the spider 20 and the backing plate 23 of aluminum and sheet steel respectively, it is possible to reduce the weight greatly without any reduction in strength.

The clutch embodying the present invention operates in exactly the same manner as clutches constructed in the ordinary way. When the clutch pedal is depressed the throw-out collar 13 is moved forward, pushing the pins 16 forward and compressing the springs 17. The forward movement of the pins 16 carries the forward driven ring 11 forward and permits the separating springs 12 to separate the driving rings 10. Thereafter, the spider 20, backing plate 23, driven rings 11, shaft 2 and gear 30 are free to revolve independently of the engine and of the propeller shaft if the gears of the transmission are in neutral position.

What I claim is:

1. In a disk clutch for motor vehicles, the combination of a driven shaft, a spider thereon having forked arms, driven rings having lugs engaging the said forked arms, a backing plate secured to said spider, and thimbles for clutch springs inserted in said backing plate.

2. In a disk clutch for motor vehicles, the combination of driving rings, a driven shaft having a non-circular end, an aluminum spider secured to said shaft and having forked arms, driven rings having lugs engaging said forked arms, a backing plate of thin sheet steel secured to said spider, and thimbles for clutch springs inserted in said backing plate, said backing plate being in contact with one of the driving rings and also performing the functions of a driven ring.

In testimony whereof I affix my signature.

STUART G. BAITS.